(12) United States Patent
Young et al.

(10) Patent No.: US 7,631,653 B2
(45) Date of Patent: Dec. 15, 2009

(54) APPARATUS FOR AUTOMATED MOVEMENT OF AN UMBRELLA

(75) Inventors: David Young, St. Charles, IL (US); Robert Tegel, Huntley, IL (US)

(73) Assignee: Young Mechatronics Solutions, LLC, St. Charles, IL (US)

( * ) Notice: Subject to any disclaimer, the term of this patent is extended or adjusted under 35 U.S.C. 154(b) by 357 days.

(21) Appl. No.: 11/282,411

(22) Filed: Nov. 17, 2005

(65) Prior Publication Data

US 2006/0124122 A1    Jun. 15, 2006

Related U.S. Application Data

(60) Provisional application No. 60/629,047, filed on Nov. 18, 2004.

(51) Int. Cl.
*A45B 17/00* (2006.01)
*A45B 3/00* (2006.01)

(52) U.S. Cl. .................. 135/15.1; 135/16; 135/20.1

(58) Field of Classification Search ............... 135/15.1; 114/124
See application file for complete search history.

(56) References Cited

U.S. PATENT DOCUMENTS

| | | | |
|---|---|---|---|
| 3,434,484 A * | 3/1969 | Dilullo ............... | 135/16 |
| 3,744,503 A | 7/1973 | Wolff et al. | |
| 3,765,434 A | 10/1973 | Riggs | |
| 3,850,186 A | 11/1974 | Weber et al. | |
| 4,347,834 A | 9/1982 | York | |
| 4,546,756 A | 10/1985 | Leroy et al. | |
| 5,029,596 A | 7/1991 | Tung | |
| 5,046,699 A | 9/1991 | Perreault et al. | |
| 5,086,797 A | 2/1992 | Earnshaw et al. | |
| 5,110,184 A | 5/1992 | Stein et al. | |
| 5,344,115 A | 9/1994 | Mayne et al. | |
| 5,441,066 A | 8/1995 | Harris | |
| 5,478,041 A | 12/1995 | Mayne | |
| 5,836,327 A | 11/1998 | Davis | |
| 5,944,384 A | 8/1999 | Patterson | |
| 6,029,595 A * | 2/2000 | Bachmann ............ | 114/125 |
| 6,058,951 A | 5/2000 | Wilson | |
| 6,234,187 B1 | 5/2001 | Izzo | |
| 6,286,530 B1 | 9/2001 | Hussey | |

(Continued)

OTHER PUBLICATIONS

Lucid Gas Springs, http://www.gas-spring.biz/gas_sping.htm, Copyright © 2000-2008 Lucid Int'l.

(Continued)

*Primary Examiner*—David Dunn
*Assistant Examiner*—Danielle Jackson
(74) *Attorney, Agent, or Firm*—McAndrews, Held & Malloy, Ltd.

(57) ABSTRACT

Apparatus and methods are provided for automated movement of an umbrella. An apparatus can be manually or automatically actuated to move the umbrella so as to provide more or less shade as desired by the user. For example, an apparatus is provided which can automatically move an umbrella to follow the movement of the sun. The apparatus can provide maximum or minimum shade (as desired) to the user throughout the day and/or can change the angle of the umbrella with little or no effort by the user. An adjustable umbrella apparatus comprising a ballast-shifting means is also provided.

24 Claims, 5 Drawing Sheets

U.S. PATENT DOCUMENTS

| | | |
|---|---|---|
| 6,311,705 B1 | 11/2001 | Ma |
| 6,330,886 B1 | 12/2001 | Culver |
| 6,364,562 B1 | 4/2002 | Tung |
| 6,401,736 B1 | 6/2002 | Jerry |
| 6,446,649 B1 * | 9/2002 | Bigford ................ 135/16 |
| 6,516,820 B1 | 2/2003 | Earnshaw |
| 6,604,844 B2 | 8/2003 | Hussey |
| 7,128,076 B2 | 10/2006 | Freedman |
| 7,188,633 B2 | 3/2007 | Zerillo |
| 7,363,930 B2 | 4/2008 | Vanderminden |
| 7,503,336 B2 | 3/2009 | Labarbera |
| 2004/0055627 A1 * | 3/2004 | Moga ................ 135/16 |
| 2004/0069922 A1 * | 4/2004 | Wu ................ 248/519 |
| 2004/0134526 A1 * | 7/2004 | Freedman ............ 135/20.3 |
| 2006/0272555 A1 * | 12/2006 | Carter ............ 108/50.12 |
| 2006/0278262 A1 | 12/2006 | Ma |

OTHER PUBLICATIONS

Lucid Gas Springs, http://www.gas-spring.biz/lock_type.htm, Copyright © 2000-2008 Lucid Int'l.

* cited by examiner

APPARATUS FOR AUTOMATED MOVEMENT OF AN UMBRELLA

CROSS-REFERENCE TO RELATED APPLICATION

This application claims the benefit of U.S. Provisional Application No. 60/629,047, filed on Nov. 18, 2004, which is incorporated by reference.

FIELD OF THE INVENTION

The present disclosure provides apparatus and methods for automated movement of an umbrella. An apparatus can be manually or automatically actuated to move the umbrella so as to provide more or less shade as desired by the user. For example, an apparatus is provided which can automatically move an umbrella to follow the movement of the sun. The apparatus can provide maximum or minimum shade (as desired) to the user throughout the day and/or can change the angle of the umbrella with little or no effort by the user. An adjustable umbrella apparatus comprising a ballast-shifting means is also provided.

BACKGROUND

U.S. Pat. No. 4,347,834 (York) describes a solar energy collector that uses a motorized device to track the sun. The collector is operatively connected with sun-tracking means for movement in a predetermined direction and through a predetermined distance relative to the center of a remote absorber of solar energy. The York '834 patent does not disclose the use of an umbrella or an apparatus to provide a user with shade or other protection from weather conditions.

U.S. Pat. No. 4,546,756 (Leroy et al.) describes a system of tracking the sun each day of the year with compensation for changes in time of sunrise and time of sunset as well as sun declination on a day to day basis, declination being under control of a crank that makes one revolution per year. Leroy '756 shows a solar energy conversion system utilizing the drive mechanism. Leroy '756 states that the device will drive a solar collector as to allow the collector to be in optimum alignment with the sun for each day of the year regardless of whether the sun is obscured by clouds, trees or other obstructions. The Leroy '756 patent does not disclose the use of an umbrella or an apparatus to provide a user with shade or other protection from weather conditions.

U.S. Pat. No. 5,110,184 (Stein et al.) describes a beach chair supported on a spike that is connected to the lower portion of the chair by a bearing arrangement. When the spike is inserted into the ground, the upper portion upon which a person is seated can be rotated relative to the lower portion of the spike to allow the seat to be rotated, so as to follow the sun or for other purposes. An umbrella is also provided on the chair. The umbrella has a canopy and a shaft which is pivotally connected by a set screw to a bracket on the chair. The Stein '184 patent does not disclose automated movement of an umbrella.

U.S. Pat. No. 5,944,384 (Patterson) describes a sun-following swivel beach chair. The sun following swivel beach chair can include a swivel plate for rotating a support structure about a vertical axis 360 degrees, so that the person in the support structure can follow the movement of the sun in the sky, to receive rays from the sun for suntanning purposes. The sun following swivel beach chair can further include a system for automatically operating the swivel plate. The automatically operating system includes a servo motor and a drive shaft extending from the servo motor. A computer is connected to the servo motor and to a solar sensor which will send signals to the computer. The computer will operate the servo motor to properly position the chair with respect to the sun in the sky. The Patterson '384 patent does not disclose the use of an umbrella or an apparatus to provide a user with shade or other protection from weather conditions.

U.S. Pat. No. 6,058,951 (Wilson) describes a remotely or manually actuated electrically operated umbrella for use with larger canopies in outdoor settings like restaurants. The umbrella uses a gear and chain drive system to urge upward a traveling rod that in turn actuates a bracket to open and close the spokes of the umbrella. The rod is controlled by movements of a pulley turned by a motor. The Wilson '951 patent does not disclose moving the entire umbrella from side to side, nor does it disclose altering the angle of the shaft of the umbrella to increase shade.

U.S. Pat. No. 6,234,187 (Izzo) describes an adjustable umbrella apparatus comprising an umbrella with a canopy and a rod. A connector is attached to the rod and has a pair of spring-loaded prongs extending therefrom. When the spring-loaded prongs are compressed, the connector may be slid longitudinally or rotatably. In this manner, the umbrella may be adjusted longitudinally and rotatably to a chosen orientation and held securely in place in that chosen orientation. The umbrella base is formed integral with or attachable to a framed chair such as a beach chair. In the Izzo '187 patent, the umbrella is adjusted without a motor. Springs and lock holes are used to place the umbrella in position. Izzo does not disclose automated movement of an umbrella.

None of the foregoing references discloses an apparatus which provides automated movement of an umbrella such that increased or decreased shade is provided as desired by the user. None of the references disclose an umbrella that can automatically follow the angle of the sun.

BRIEF SUMMARY OF THE INVENTION

A novel apparatus is provided for automated movement of an umbrella. The apparatus comprises a means for holding an umbrella having a pole and a canopy such that the pole and the ground define a pole angle. The apparatus also comprises a means for automatedly moving the umbrella whereby the pole angle is adjusted. The means for moving the umbrella may be capable of rotating the pole around one or more axes perpendicular to the pole.

The means for moving the umbrella can be a ballast-shifting means, which is connected to the umbrella so that a shift in the ballast will adjust the pole angle of the umbrella. For example, an apparatus for automated movement of an umbrella can include an umbrella holder, at least two ballast compartments on different sides of the umbrella, and a pump adapted for pumping a ballast from one of the compartments to another of the compartments. Alternatively the ballast-shifting means can include at least four ballast compartments on different sides of the umbrella, thus enabling the umbrella to be rotated around more than one axis perpendicular to the pole. Alternatively the means for moving the umbrella can comprise at least one motor that is operatively connected to and capable of adjusting the umbrella. For example, an apparatus for automated movement of an umbrella can include an umbrella holder and a motor operatively connected to the umbrella holder whereby the motor rotates the pole around an axis perpendicular to the pole. The motor can be attached to a shaft, optionally by a gear reducer and/or a coupling, and the shaft can be attached to the umbrella holder.

The present apparatus for automated movement of an umbrella can also include a sun-tracking means operatively connected to the means for moving the umbrella, which can so that the umbrella will automatically follow the angle of the sun. The apparatus can also include a controller operatively connected to the means for moving the umbrella whereby movement of the umbrella is manually or automatically actuated.

As another aspect of the invention, an apparatus is disclosed for providing protection from sun or other weather conditions. The apparatus includes an umbrella and one of the apparatus for automated movement of an umbrella described herein.

As yet another aspect of the invention, an adjustable umbrella apparatus is provided. The apparatus allows a user to easily select a pole angle, and then maintains the selected pole angle. The apparatus includes an umbrella holder and at least two ballast compartments disposed on different sides of the umbrella holder. The ballast compartments can be adapted so that when tilting action is applied to select a pole angle for the umbrella, ballast transfers from the first compartment to the second compartment. The ballast then maintains the desired pole angle after the user stops applying the tilting action. The adjustable umbrella apparatus is advantageous in that it is tip-resistant and easily tiltable.

DETAILED DESCRIPTION OF THE INVENTION

The present disclosure provides an umbrella apparatus which allows a user to easily adjust the umbrella to provide increased or decreased shade as desired by the user and/or an umbrella is automatically adjusted to follow the angle of the sun. The apparatus can provide maximum shade to a beach-goer, or minimum shade to a sunbather, throughout the day. Further, the apparatus may be used at sporting events, cafes, pools, picnics, backyards, or any other location where protection from the sun or other elements is desirable. In one embodiment (a manual version), the sunbather can use simple push button controls, a remote control, or another control means to adjust the umbrella. By doing so, the user can manually actuate the automated movement of the umbrella. In another embodiment (an automatic version), the umbrella is automatically adjusted based upon the time and/or the sun's position. The automated movement of the umbrella is actuated by means of a timer or a sun-tracking device.

Various embodiments of the present apparatus can provide one or more advantages over the prior art, including but not limited to: physical adjustment of the umbrella to align with the sun and give maximum shade and/or increased protection against one or more weather conditions; protection against the sun if the sunbather falls asleep; simple push buttons or other controls that allow the user to easily adjust the umbrella to maximize or minimize shade under the sun; and/or automated movement of the umbrella to follow the sun.

Figure 1:
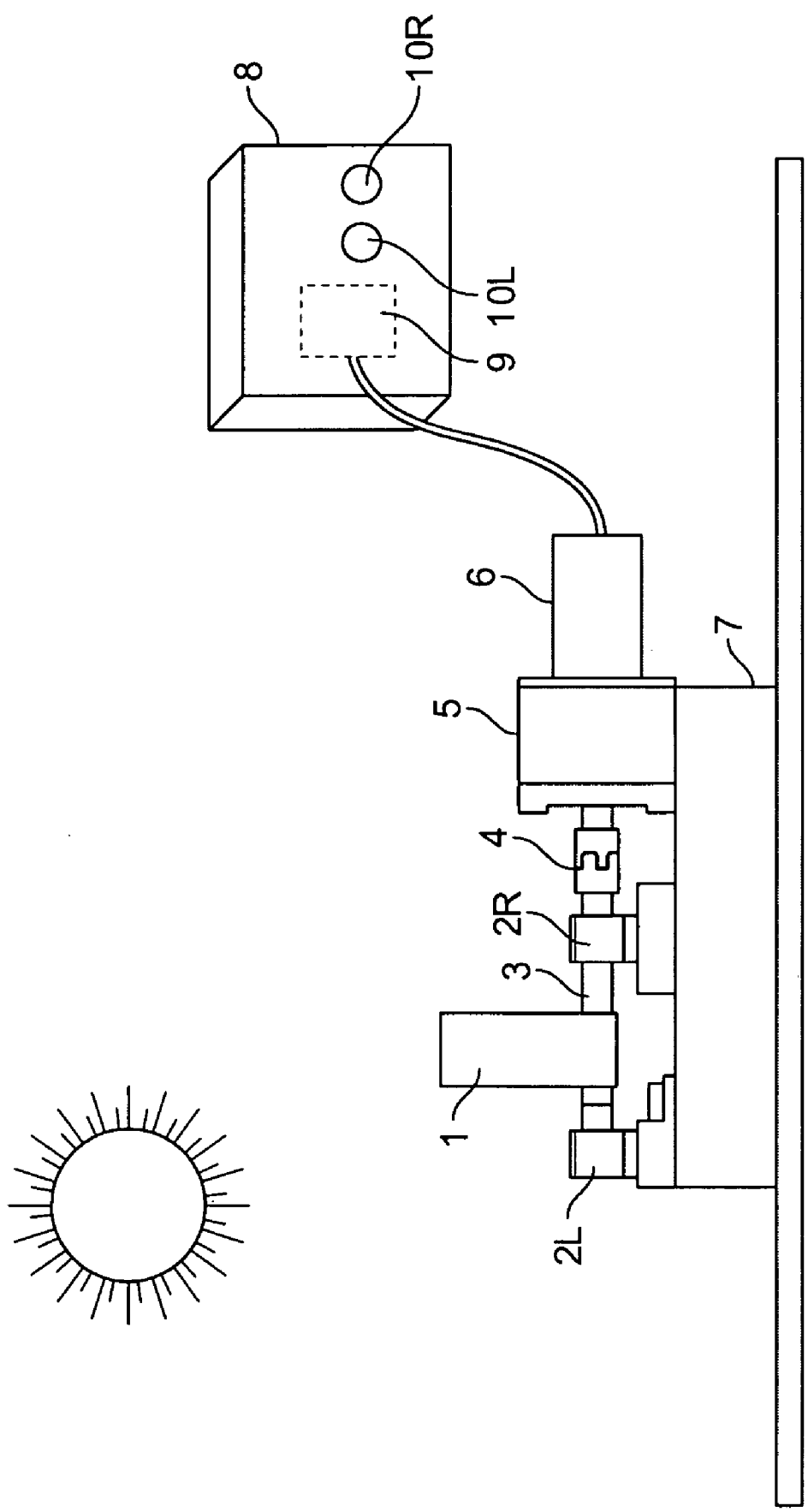
FIG. 1 shows a side view of an apparatus for automated movement of an umbrella.
Figure 2:
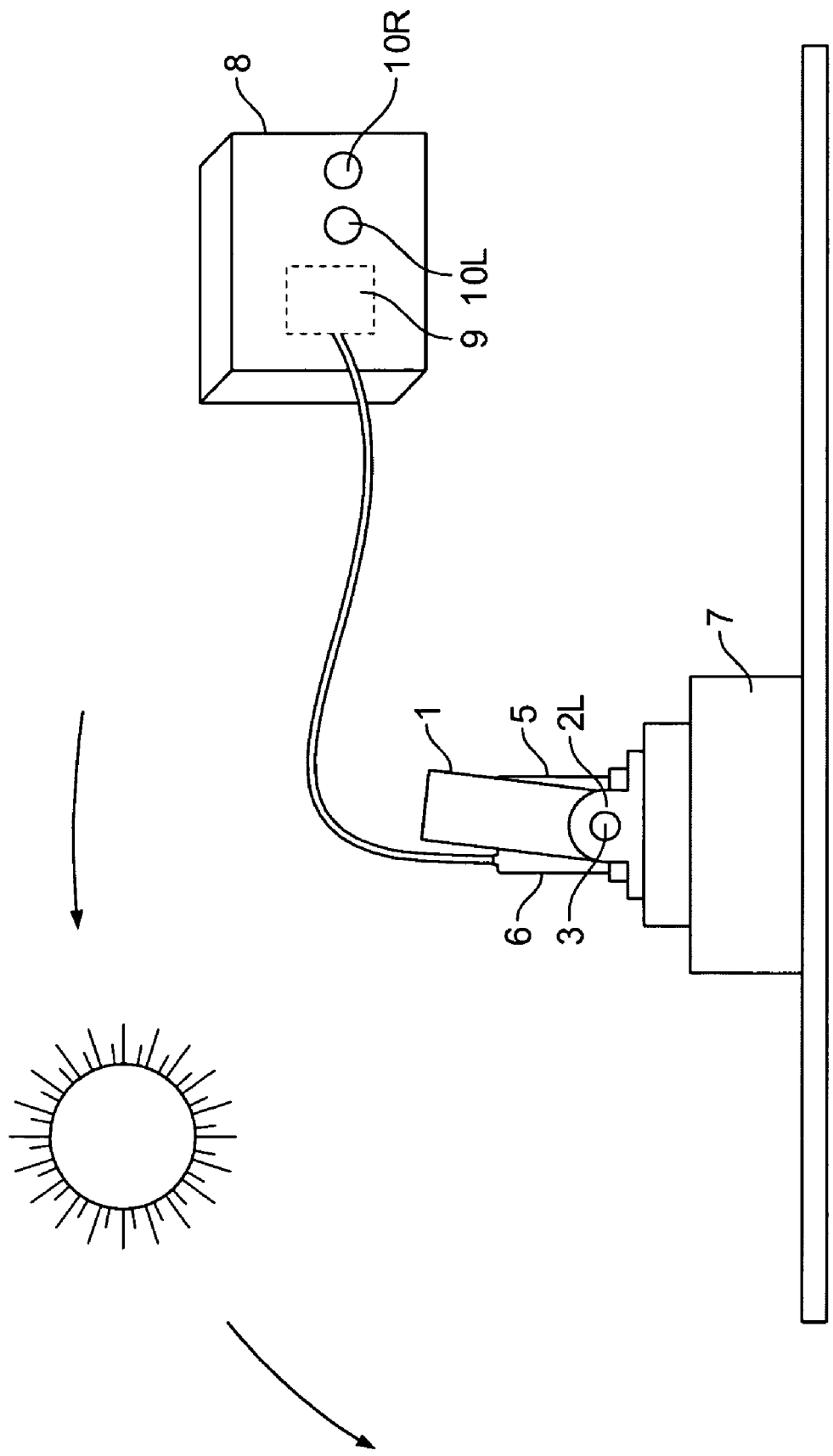
FIG. 2 shows a front view of an apparatus for automated movement of an umbrella.
Figure 3:
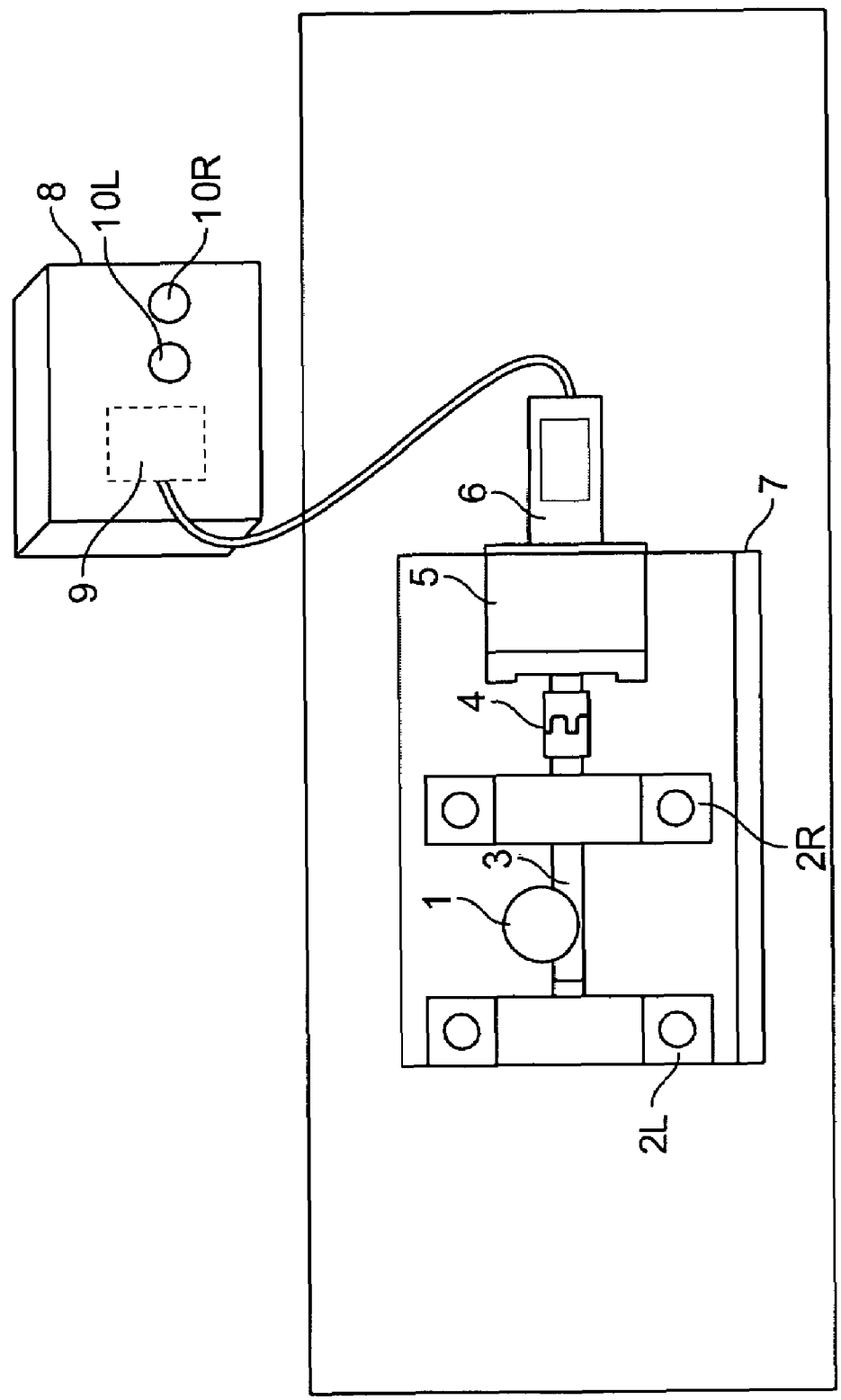
FIG. 3 shows a top view of an apparatus for automated movement of an umbrella.

An apparatus for automated movement of an umbrella is shown in FIGS. 1, 2 and 3. This embodiment of the apparatus includes an umbrella holding means and a means for automatedly moving an umbrella. While FIGS. 1-3 show one possible means for moving the umbrella, other means are also described below. In FIGS. 1-3, the means for moving an umbrella includes a motor that is operatively connected (either directly or indirectly) to an umbrella holder 1 such that the motor is capable of moving the umbrella. More particularly, the motor is operatively connected to the umbrella holder via a gear reducer 5, a coupling 4, and a shaft 3. Bearings 2L and 2R support the shaft 3 which is capable of rotating within the bearings 2L and 2R. The umbrella holder 1 is attached to the shaft 3 such that the umbrella holder 1 can hold an umbrella perpendicular to the shaft 3. Bearings 2L and 2R are attached to a base 7 via screws, bolts, nails, soldering, rivets, adhesives or other attachment means. The base 7 can be any suitable material, such as steel, aluminum, plastic, etc. Alternatively the bearings can be formed integrally with the base 7 or eliminated all together. Preferably, bearings 2L and 2R are included to ensure that the shaft on the gear reducer 5 is protected against excessive loads from the umbrella. A gear reducer 5 is attached to base 7 via screws, bolts, nails, soldering, rivets, adhesives, or other attachment means. Alternatively the gear reducer can be formed integrally with the base.

In FIGS. 1-3, the motor 6 is attached to the gear reducer 5 via screws, bolts, nails, soldering, rivets, adhesives, or other attachment means, including being integrally formed with the base; however, the gear reducer 5 may be eliminated or replaced by a means for performing the same function. The motor 6 can be any type of motor: combustion, electric, combustion/electric hybrid, brushless, servo, AC, DC, stepper, gear motor, etc. A coupling 4 attaches the output of gear reducer 5 to a main shaft 3; however, the coupling 4 may be eliminated or replaced by a means for performing the same function. As a means for holding the umbrella, an umbrella holder 1 is attached to the shaft 3. For example, the umbrella holder 1 may be a tube which may optionally include screws, bolts, nails, soldering, rivets, adhesives, or other means, for attaching the umbrella to the tube; however, the umbrella holder 1 can be a clamp, jaws, or any other means as may be recognized by a skilled artisan. Alternatively, the umbrella may be directly attached to the shaft 3, thereby making the shaft an umbrella holder or holding means. The umbrella holder 1 can be rotated around an axis that is perpendicular to the umbrella, the umbrella pole and/or the umbrella holder, such as the axis defined by shaft 3. For example, the axis defined by shaft 3 can be aligned with the polar North which would enable the rotation of the umbrella holder along an East-West axis.

In FIGS. 1-3, a control box 8 houses a motor/drive controller 9. The motor 6 wires into control box 8 and is operatively connected to the controller 9 so that the controller can be used to manually actuate movement of the umbrella. Alternatively the controller may operatively connected to the motor wirelessly, so long as a control signal may be send by the controller to actuate the motor. Alternatively or additionally the controller can be programmed to cause the umbrella to automatically follow the movement of the sun or to adjust the umbrella at selected time intervals. For manual actuation, push buttons 10L and 10R are located on control box 8 and provide a user interface with the controller 9 so that a user can control the motor 6 and the movement of the umbrella holder 1. Push button control 10L, when pressed, rotates the umbrella holder 1 (or any umbrella in the umbrella holder) in western direction. Push button control 10R, when pressed, rotates the umbrella holder 1 in eastern direction.

An umbrella can be inserted into the umbrella holder to provide an apparatus that provides adjustable protection from sun, rain, wind and/or other weather conditions. An umbrella typically includes a pole and a canopy, and may also include a frame that extends (or withdraws) the canopy as well as other components. Canopies can be water repellant or water permeable, and can be canvas, metal, plastic, or another material that provides some protection from the sun, wind, rain or other weather conditions. The umbrella (particularly the canopy) can be shaped like a dome, a cone, or any other suitable shape. The term umbrella is intended to include anything that provides protection from one or more weather conditions and is not limited to any particular shape or material. When the umbrella is in use, the umbrella pole and the ground can be considered as defining a pole angle. Even where the ground is not precisely flat, the user will have a sense of the degree of tilt of the umbrella, especially vis-à-vis the sun, rain, wind, or other weather conditions. In general, a change in the pole angle of an umbrella can be readily detected by the user.

With the apparatus shown in FIGS. 1, 2 and 3, a beachgoer, sunbather or other user can rotate the umbrella to avoid (or allow) sun exposure by pushing button 10L or button 10R. Push button 10L, when pressed, rotates the umbrella in a first direction (for example, in a western direction). When an umbrella is inserted into umbrella holding means 1, the user can maximize or minimize shade provided by the umbrella simply by pressing button 10L or button 10R. Push button control 10R, when pressed, rotates the umbrella in a second direction (for example, in an eastern direction). When pushing button 10R, motor 6 will rotate clockwise. As motor 6 rotates inside gear reducer 5, the coupling 4 transmits torque from the gear reducer 5 to the main shaft 3. As the main shaft 3 rotates, the umbrella holder (and the umbrella) 1 rotates. This makes the umbrella rotate toward or away from the sun (dependent upon whether the user wishes to be exposed to direct sun). Most of the time, the umbrella will be directed toward the sun to maximize shade against the sun provided by the umbrella. However, the user can easily adjust the umbrella or decrease the shade or protection provided by the umbrella. The user can easily change the pole angle of the umbrella (the angle defined by the pole and the ground). The same results occur when pushing button 10L, except that the rotation is counter-clockwise.

Alternatively a servo motor can be used for adjusting the position of the umbrella. A servo motor has an output shaft that can be positioned to specific angular positions by sending the servo motor a coded signal. As long as the coded signal exists on the input line, the servo will maintain the angular position of the shaft. As the coded signal changes, the angular position of the shaft changes. In practice, servos are used in radio controlled airplanes to position control surfaces like the elevators and rudders. The angle of the shaft is determined by the duration of a pulse that is applied to the control wire.

The present apparatus can also include means for rotating the umbrella around more than one axis. Additional axes could be used to increase shade provided by the umbrella. For example, an assembly of three rotors with axes perpendicular to each other, as shown in the York '834 patent can be provided. The present apparatus can comprise additional motors and/or shafts to provide movement around more than one axis (including, but not limited to, stepper, servo, AC, DC motors).

The apparatus can include various elbows or joints to provide additional range of motion.

Other methods and means for moving an umbrella holding means are also contemplated. For example, the umbrella holder can be adjusted by use of rack and pinion, worm gear, barrel cam, Geneva mechanism, or any other form of geared motion, and the means for moving the umbrella can include any of these. As other examples, the means for moving the umbrella could comprise one or more cylinders configured to provide motion of the umbrella (such as pneumatic, hydraulic, electric, etc.).

Figure 4:
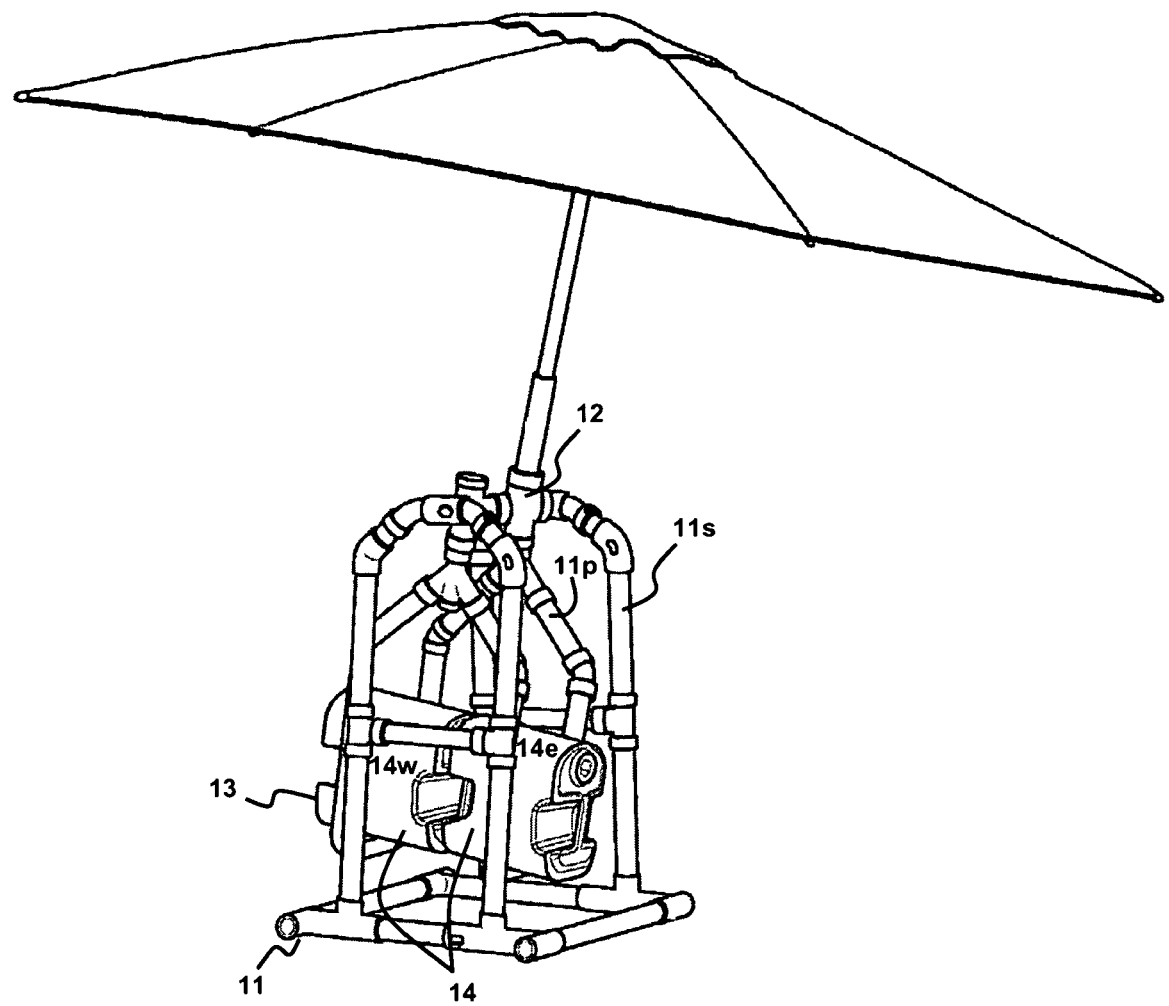
FIG. 4 shows an apparatus for providing protection from the sun or other weather conditions.

Another embodiment of the present apparatus is shown in FIG. 4. In this embodiment, the apparatus comprises a frame 11, a pivot 12 and a ballast-shifting means 13. The ballast-shifting means can include at least two compartments for ballast and a pump fluidly connected to the compartments and adapted for pumping ballast from one of the compartments to another of the compartments. A shift in the ballast distributed between the two compartments will adjust the pole angle of the umbrella.

The frame 11 has a stationary portion 11s and a pivotable portion 11p. The pivotable portion provides a means for holding an umbrella so that the umbrella, held by the pivotable portion of the frame 11p, is able to be moved or adjusted in at least one direction. For example, the pivotable portion of the frame 11p can be adapted for allowing angular movement of the umbrella around a pivot 12. It is also contemplated that a pivot can allow movement of the umbrella along more than one axis or circular motion around the pivot. In the apparatus shown in FIG. 4, a pivot 12 is provided at the top of the frame 11 by the connection between the stationary portion of the frame 11s and the pivotable portion of the frame 11p. In this example of a pivot, tubes from the pivotable portion of the frame 11p fit concentrically inside tubes of the stationary portion of the frame 11s. Grease or another lubricant can be used to reduce friction between the concentric tubes, though some friction may be desirable. In this embodiment, a means of moving an umbrella comprises a ballast-shifting means 13, having at least two compartments 14, attached to the pivotable portion of the frame 11p. The extent of angular movement by the umbrella can define an arc, the length of which is determined by the amount of ballast present in the compartments 14 of the ballast-shifting means 13. When the umbrella can move along more than one axis, the movement of the umbrella can define a partial or full orbit. In FIG. 4, the compartments 14 are on different sides of the pivotable portion of the frame 11p. the compartments are diametrically opposite to each other, though the compartments on different sides do not have to be precisely opposite.

Figure 5:
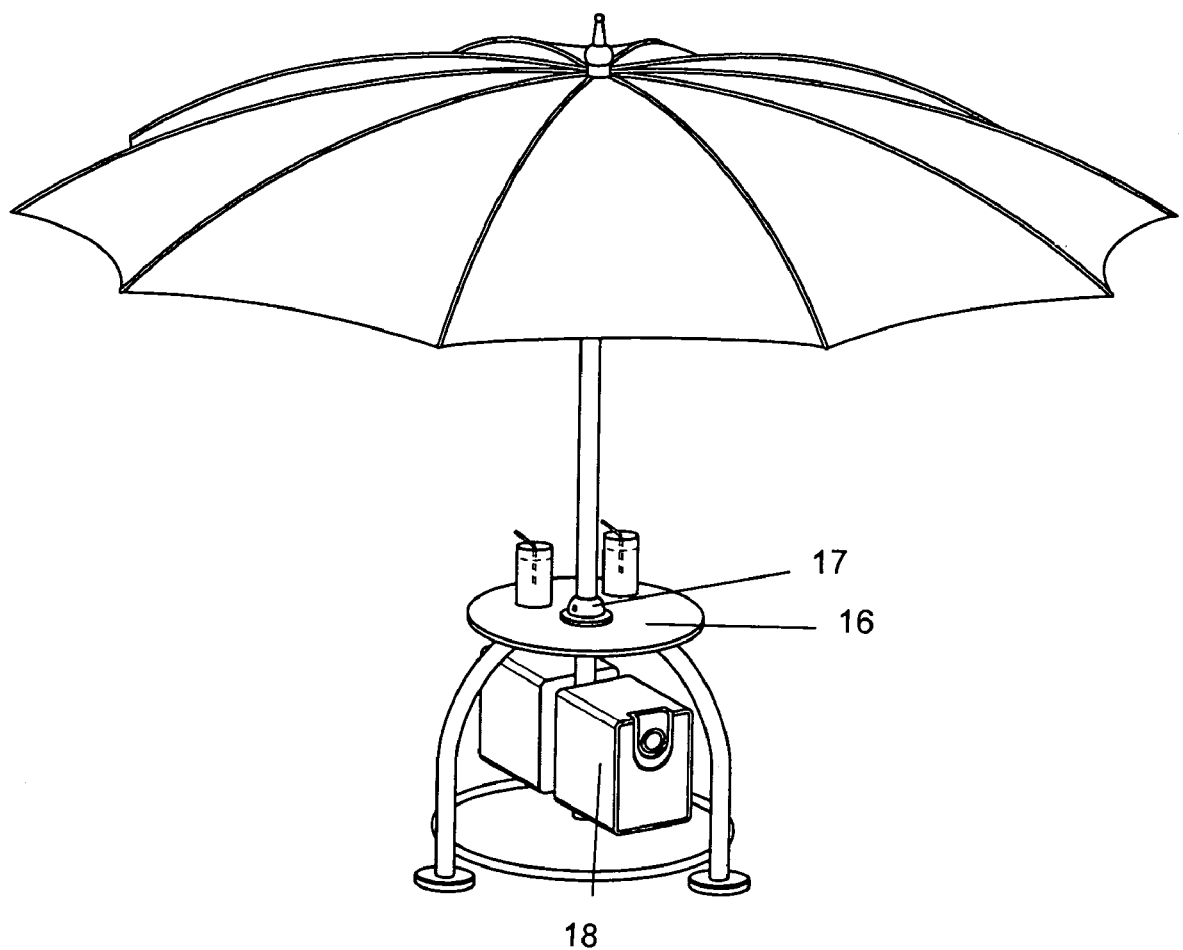
FIG. 5 shows another apparatus for providing protection from the sun or other weather conditions.

FIG. 5 shows an alternative configuration of the present apparatus for providing protection from the sun, rain, wind or other weather conditions. In this configuration, the stationary portion of the umbrella holder 16 may be adapted for serving as a table. For example, a patio table can be the stationary portion of an umbrella holding means. As the pivotable portion of the umbrella holder 17, a ball pivot is provided in the table which is adapted for holding an umbrella. The ballast-shifting means 18 can serve as a means for moving the umbrella and is operatively connected to the pivotable portion of the umbrella holder, either directly or by using the pole of the umbrella as an intermediary. A ball pivot 17 is shown in FIG. 5, though other pivots (such as the tubes described with FIG. 4) can be employed as a means for pivoting.

As shown in FIGS. 4 and 5, the pivotable portion of the umbrella holder is rotated or adjusted via the ballast-shifting means. In FIG. 4, the ballast-shifting means 13 is suspended from the pivotable portion of the frame 11p such that when the ballast held by the ballast-shifting means 13 is biased towards one side of the ballast-shifting means 13, the pivotable portion of the frame 11p will pivot the umbrella toward the biased side. For example, if there is more ballast added to the east side of the ballast-shifting means 13, the pivotable portion of the frame 11p will move and the umbrella will be adjusted toward the east. If the ballast is shifted back towards the western side of the ballast-shifting means 13, the pivotable portion of the frame 11p will rotate so that the umbrella will be adjusted toward the west. Preferably, the ballast-shifting means 13 will have at least two compartments 14 for holding ballast. The two compartments 14 can be disposed in a single container or they can be separate containers. For example, a single container can contain one or more compartments separated by a wall, baffle, valve or other separation means, and/or may contain one or more bladders for holding the ballast. As another example, as in FIG. 4, separate containers define an eastern compartment 14e and a western compartment 14w, between which the ballast can be transferred to effectuate an eastern or western weight bias within the ballast-shifting means 13.

If additional compartments are employed, oriented, for example, perpendicularly to eastern compartment 14e and western compartment 14w, then the pivotable portion of the frame 11p may be rotated about a second axis. The present apparatus can comprise two of the pump-and-container assemblies shown in FIG. 4, oriented perpendicularly to each other. The assemblies can be stacked, one on top of the other, or positions in the same plane. An apparatus comprising two (or more) pump-and-container assemblies can move the umbrella along each of two (or more) axes determined by the assemblies. Such an apparatus can move the umbrella in an orbit or partial orbit rather than an arc, and allow the user to move the canopy to a desired orientation.

The ballast can be any suitable material which can be transferred from one side of the umbrella to the other side. A fluid such as water can serve as the ballast that is transferred between the compartments 14. A pump (not shown) will convey the fluid ballast between the eastern compartment 14e and the western compartment 14w. The pump can be located inside the container or outside the container. When pushing push button 10R, the pump will pump the fluid ballast from the eastern compartment 14e to the western compartment 14w to rotate the pivotable portion of the frame 11p counter-clockwise. The same results occur when pushing button 10L, except that the pump will pump the fluid ballast from the western compartment 14w to the eastern compartment 14e to rotate the pivotable portion of the frame 11p clockwise.

The ballast-shifting means described above is also useful as an adjustable umbrella apparatus, even without a means for automated movement of the umbrella. An adjustable umbrella apparatus that includes the ballast-shifting means (such as two compartments) but does not include a pump or motor for automatedly transferring ballast may be useful due to its tiltability and tip-resistance. The compartments of the ballast-shifting means may be constructed such that the ballast may be transferred between the compartments without the use of a pump. For example, if the compartments were separated by a wall, baffle, valve or other separation means, a user may adjust the pole angle and move the canopy in a western direction, causing the ballast to flow from the eastern compartment to the western compartment, and the separation means will maintain the ballast in the western compartment, thus maintaining the western tilt and desired pole angle of the umbrella. Correspondingly, the user may adjust the pole angle and move the canopy in an eastern direction, causing the ballast to flow from the western compartment into the eastern compartment where the separation means will maintain the ballast in the eastern compartment and maintain the eastern tilt and desired pole angle of the umbrella.

An alternative ballast-shifting means comprises a threaded weight suspended about a screw such that when the screw is rotated in one direction, the weight is drawn in an eastern direction and when the screw is rotated in the opposite direction, the weight is drawn in a western direction.

Other embodiments of the present apparatus can include means for shifting a ballast such that the umbrella is moved along a second arc aligned, for example, in a North-South direction. As described above, a second assembly of compartments and a pump such as that shown in FIG. 4 can be connected perpendicularly to the first assembly. Using the multiple compartment pairs, the movement of the umbrella is not limited to any particular number of arcs.

An additional advantage of the present disclosure is that it also provides an apparatus for holding an umbrella which is resistant to tipping although it should be recognized that this advantage need not necessarily be present in every embodiment of the disclosure. As an example, the apparatus shown in FIG. 4 is resistant to tipping by winds having speeds of at least about 20 miles per hour (mph). Preferably, the umbrella does not tip in winds of at least about 30 mph and/or when the umbrella is fully opened at an angle of about 45 degrees relative to the ground. A tip-resistant umbrella apparatus is especially desirable for use in environments having potential for high winds, such as rooftop decks, beaches, cruise ships, and other locales. When tip-resistance is particularly desirable, the apparatus can be provided with at least about 60 pounds of ballast in the ballast-shifting means. A person of ordinary skill in the art will recognize that the wind speeds, umbrella tilt angles and ballast weights disclosed herein are provided for mere context and as exemplary embodiments and are not to be interpreted as limitations on the disclosure.

The automated motion of the umbrella can be controlled by manually actuating a controller, as described above, or by some other means. Alternatively, the automated motion of the umbrella can be automatically controlled, such as by a computer or programmable logic controller. An apparatus can include a controller that provides both manual and automatic actuation at the option of the user. The automated motion of the umbrella can be controlled so as to track the sun, and the apparatus can include a timer or a sun-tracking means for this function. The automated motion may be controlled by a computer which instructs the motor in accordance with data stored in a memory; alternately the motor may be coupled to an adjustable timer or sun-tracking means. The hydraulic, mechanical or electronic components of a sun-tracking means may include sun sensors and/or appropriate circuits for the control and coordination of the various movements.

The sun-tracking means may be operatively connected with the means for moving the umbrella. The sun-tracking means can be configured to continuously align the umbrella with the sun as it moves across the sky during all or a portion of the day. The sun-tracking means may include mechanical, hydraulic, electric and electronic components which are well-known and commercially available.

For example, assembled systems for tracking the sun have been described in the art. Some systems use photo-responsive electrical devices and electrical circuitry connected thereto which determine the direction of sun movement relative to the photo-responsive devices and continually, via the electronic or electrical circuitry, realigning the system so that the sun was always at the center of the photo-responsive device. Systems for providing automated movement, or a signal triggering automated movement, based on a predetermined interval, are also known. The present apparatus may include a system for tracking the sun from east to west with automatic adjustments being made on a minute-by-minute or other basis.

The present apparatus for automated movement of an umbrella can also include means for physically moving the umbrella without the use of a motor or other means. A hand crank instead of a motor or other means could be used to rotate the umbrella or the umbrella holder, or the gear reducer shown in FIGS. 1-3. The hand crank may be desirable as a fall-back if the motor fails to operate.

With regard to means for controlling the automated movement of the umbrella, any of a variety of user interfaces may be employed. In FIGS. 1-3, the controller 9 is shown with push buttons 10L and 10R, but other interfaces may be used as well. For example, one or more dials, switches, or knobs can be provided, or a touchscreen can be provided for controls. Moreover, the controller can be part of a network or otherwise controlled by a computerized system.

When the apparatus is to be manually actuated, it can be manually actuated through one or more push buttons, dials or other controls to be adjusted by a user. Alternatively or additionally, the apparatus can be actuated through a remote control; a controller for the apparatus can include a remote control. For example, the means for moving the umbrella may be controlled by a remote control. The remote control may operate by radio frequency waves or by electric signals sent through a conductive line. Other remote controls are possible. For example, systems based on or similar to those used in garage door openers can be employed. The control system can send a signal to drive the means for moving the umbrella and hence the umbrella in one direction and another signal to drive the means for moving the umbrella in another direction. In some embodiments, a central control can be adapted for sending signals to a plurality of remotely located means for moving an umbrella at the base of a plurality of umbrellas, such as may be found in a sidewalk café. Various methods of actuating the means for moving the umbrella are possible without varying from the spirit of the present disclosure.

The present disclosure also relates to methods for automated movement of an umbrella. The methods can comprise continually moving an umbrella, such as to follow the path of the sun or to change the angle of the umbrella pole relative to the ground. Alternatively, the methods can comprise moving an umbrella at predetermined intervals, such as approximately every five minutes (or approximately every 1 minute, 2 minutes, 10 minutes, or another interval).

In the present specification, use of the singular includes the plural except where specifically indicated. In the present specification, any of the functions recited herein may be performed by one or more means for performing such functions.

All patents cited herein are fully incorporated by reference to the extent such disclosure is not inconsistent with this apparatus and for all jurisdictions in which such incorporation is permitted.

While the presently disclosed apparatus has been described and illustrated by reference to particular embodiments, it will be appreciated by those of ordinary skill in the art that the invention lends itself to many different variations not illustrated herein. Accordingly, the scope of the present invention is not limited to any particular embodiment but rather is defined by the appended claims.

Although the dependent claims have single dependencies in accordance with U.S. patent practice, each of the features in any of the dependent claims can be combined with each of the features of other dependent claims or the main claim.

The invention claimed is:

1. An apparatus for movement of an umbrella comprising:
   (a) a means for holding an umbrella having a pole and a canopy such that the pole and the ground define a pole angle; and
   (b) a ballast-shifting means for moving the umbrella whereby the pole angle is adjusted.

2. The apparatus of claim 1 wherein the ballast-shifting means comprises
   (i) at least two compartments for ballast; and
   (ii) a pump fluidly connected to the compartments and adapted for pumping ballast from one of the compartments to another of the compartments.

3. The apparatus of claim 2 wherein the means for moving the umbrella comprises at least one motor.

4. The apparatus of claim 1 wherein the means for moving the umbrella is capable of rotating the pole around one or more axes perpendicular to the pole.

5. The apparatus of claim 1 further comprising a sun-tracking means operatively connected to the means for moving the umbrella.

6. The apparatus of claim 1 further comprising control means operatively connected to the means for moving the umbrella whereby movement of the umbrella is manually or automatically actuated.

7. An apparatus for providing protection from sun or other weather conditions comprising:
   (1) the apparatus of claim 1; and
   (2) an umbrella held by the means for holding the umbrella.

8. The apparatus of claim 1 wherein the ballast-shifting means comprises a weight that can be drawn in a one direction and in an opposite direction.

9. The apparatus of claim 1, wherein the umbrella holding means comprises a pivot adapted for pivotably holding the umbrella.

10. The apparatus of claim 1 wherein the umbrella holding means comprises a table and a pivot in the table adapted for holding and rotating an umbrella.

11. The apparatus of claim 1 wherein the ballast-shifting means is adapted for rotating the umbrella.

12. An apparatus for automated movement of an umbrella comprising
   (a) an umbrella holder having a pivot adapted for pivotably holding an umbrella;
   (b) at least two ballast compartments on different sides of the umbrella holder, wherein the ballast compartments are adapted so that a shift in the ballast between the compartments adjusts a pole angle of the umbrella; and
   (c) a pump adapted for pumping a ballast from one of the compartments to another of the compartments.

13. The apparatus of claim 12 further comprising a controller operatively connected to the pump.

14. The apparatus of claim 13, wherein the controller is programmed to cause the umbrella to automatically follow the movement of the sun.

15. The apparatus of claim 13, wherein the controller comprises a remote control.

16. The apparatus of claim 12 comprising at least four ballast compartments on different sides of the umbrella.

17. The umbrella apparatus of claim 12 wherein the umbrella holder comprises a stationary portion and a pivotable portion.

18. The umbrella apparatus of claim 12 wherein the umbrella holder comprises a table and said pivot adapted for holding the umbrella is provided in the table.

19. An adjustable umbrella apparatus comprising:
(a) a means for holding an umbrella having a pole and a canopy such that the pole and the ground define a pole angle;
(b) a ballast-shifting means adapted for shifting ballast to adjust the pole angle of the umbrella.

20. The apparatus of claim 19 wherein the ballast-shifting means comprises a ballast material that can be transferred from one side of the umbrella to another.

21. The apparatus of claim 19 wherein the ballast-shifting means comprises a weight that can be drawn in a one direction and in an opposite direction.

22. The apparatus of claim 19 wherein the umbrella holding means comprises a pivot adapted for pivotably holding the umbrella.

23. The apparatus of claim 19 wherein the umbrella holding means comprises a table and a ball pivot in the table adapted for holding an umbrella.

24. An apparatus for providing protection from sun or other weather conditions, the apparatus comprising:
an umbrella;
an umbrella holder having a stationary portion and a pivotable portion, wherein the stationary portion is adapted for serving as a table, and the pivotable portion comprises a ball pivot and is adapted for holding the umbrella and is provided in the table;
a means for moving the umbrella which is operatively connected to the pivotable portion of the umbrella holder.

* * * * *

UNITED STATES PATENT AND TRADEMARK OFFICE
CERTIFICATE OF CORRECTION

PATENT NO. : 7,631,653 B2 Page 1 of 1
APPLICATION NO. : 11/282411
DATED : December 15, 2009
INVENTOR(S) : Young et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Second Day of November, 2010

David J. Kappos
*Director of the United States Patent and Trademark Office*